(12) United States Patent
Meinl et al.

(10) Patent No.: US 10,322,635 B2
(45) Date of Patent: Jun. 18, 2019

(54) CHARGING APPARATUS FOR A VEHICLE THAT CAN BE DRIVEN ELECTRICALLY

(71) Applicant: Dr. Ing. h.c. F. Porsche Aktiengesellschaft, Stuttgart (DE)

(72) Inventors: Sven Meinl, Nuertingen (DE); Siegfried Walter, Leonberg (DE); Jochen Eppele, Knittlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 68 days.

(21) Appl. No.: 14/882,863

(22) Filed: Oct. 14, 2015

(65) Prior Publication Data

US 2016/0121744 A1    May 5, 2016

(30) Foreign Application Priority Data

Oct. 31, 2014 (DE) .......................... 10 2014 115 907

(51) Int. Cl.
  *B60L 11/18*    (2006.01)
  *B60K 15/05*    (2006.01)
  *F16J 15/02*    (2006.01)
(52) U.S. Cl.
  CPC .......... *B60L 11/1818* (2013.01); *B60K 15/05* (2013.01); *F16J 15/027* (2013.01);
  (Continued)
(58) Field of Classification Search
  CPC .................................................... H02J 7/0042
  See application file for complete search history.

(56) References Cited

U.S. PATENT DOCUMENTS

2003/0062741 A1* 4/2003 Joerg .................... B60K 15/05
                                                    296/97.22
2006/0108747 A1  5/2006 Kesseg
                  (Continued)

FOREIGN PATENT DOCUMENTS

BE           523095 A      10/1953
DE        694 00 812        2/1997
                  (Continued)

OTHER PUBLICATIONS

Journee, EP0545813 translation, Jun. 1993, Seal for the filler neck of the fuel tank.*

(Continued)

*Primary Examiner* — Robert J Grant
*Assistant Examiner* — Tynese V McDaniel
(74) *Attorney, Agent, or Firm* — Gerald E. Hespos; Michael J. Porco; Matthew T. Hespos

(57) ABSTRACT

A charging apparatus (1) for a vehicle that can be driven electrically has a charging cradle (4) with an access opening (8) and an electrical charging socket (5) is arranged in the charging cradle (4). A closure cover (7) is mounted pivotably in the charging cradle (4) and, in a closed position, covers the access opening (8) in the charging cradle (4) and, in an open position, opens said access opening. A sealing ring (12) which extends around the charging socket (5), and the closure cover (7) has a ring attachment (13) that makes contact with the sealing ring (12) along a ring contour of the sealing ring when the closure cover (7) is closed. Thus, the charging socket is sealed off reliably to the outside.

7 Claims, 2 Drawing Sheets

(52) U.S. Cl.
CPC ....... *B60Y 2200/91* (2013.01); *B60Y 2200/92* (2013.01); *Y02T 10/7005* (2013.01); *Y02T 10/7072* (2013.01); *Y02T 90/14* (2013.01)

(56) References Cited

U.S. PATENT DOCUMENTS

| | | | |
|---|---|---|---|
| 2008/0006633 A1* | 1/2008 | Yoshida | B60K 15/0406 220/304 |
| 2008/0072972 A1* | 3/2008 | Ehrman | B60K 15/03519 137/493.7 |
| 2009/0242557 A1 | 10/2009 | Journee | |
| 2011/0306223 A1* | 12/2011 | Bauer | H01R 13/447 439/136 |
| 2013/0134175 A1* | 5/2013 | O'Hara | B60K 15/00 220/827 |
| 2014/0060920 A1 | 3/2014 | Tamaoki | |
| 2015/0274010 A1 | 10/2015 | Roth et al. | |

FOREIGN PATENT DOCUMENTS

| | | | | |
|---|---|---|---|---|
| DE | 102011012032 A1 | | 8/2012 | |
| DE | 10 2011 114 383 | | 3/2013 | |
| DE | 102011114383 | * | 3/2013 | ............ E05B 83/34 |
| DE | 10 2012 019 796 | | 9/2013 | |
| DE | 10 2013 021 849 | | 8/2014 | |
| EP | 0545813 A1 | * | 6/1993 | ......... B60K 15/0406 |
| EP | 2581250 A1 | | 4/2013 | |
| FR | 2 765 837 | | 1/1999 | |

OTHER PUBLICATIONS

Basavarajappa, DE102011114383 translation Mar. 2013, Verriegelung f?r den Ladeanschluss eines Kraftfahrzeugs.*
British Examination Report dated Jan. 31, 2017.
German Search Report dated Feb. 26, 2015.
French Preliminary Report dated Aug. 30, 2016.

* cited by examiner

CHARGING APPARATUS FOR A VEHICLE THAT CAN BE DRIVEN ELECTRICALLY

CROSS REFERENCE TO RELATED APPLICATION

This application claims priority under 35 USC 119 to German Patent Appl. No. 10 2014 115 907.1 filed on Oct. 31, 2014, the entire disclosure of which is incorporated herein by reference.

BACKGROUND

1. Field of the Invention

The invention relates to a charging apparatus for a vehicle that can be driven electrically. The charging device has: a charging cradle with an access opening, an electrical charging socket arranged within the charging cradle, a closure cover mounted pivotably in the charging cradle for selectively covering or opening the access opening in the charging cradle and a seal.

2. Description of the Related Art

The above-described charging apparatuses are used in vehicles with a hybrid or an electric drive. Vehicles of this kind have at least one battery or one traction battery. The battery of a plug-in hybrid vehicle (PHEV) or a battery electric vehicle (BEV) can be charged by an electrical charging socket that is accessible from outside the vehicle body by connection, for example, to an electrical charging station or a conventional domestic electrical connection. The charging socket is arranged in a charging recess in the vehicle body, and the charging recess is covered or closed by a closure cover. A mechanism that interacts with the closure cover selectively allows the charging recess to be opened and closed or the closure cover to be flipped open and flipped shut relative to the charging recess and therefore allows access to the charging socket. The mechanism can contain, for example, a so-called push-push kinematics system, as is already used in conventional fuel caps.

A charging apparatus that exhibits the above-described features is shown in DE 10 2012 019 796 A1. In this charging apparatus, a seal is used to protect the electrical charging socket, which has metallic contacts, against the ingress of dirt, dust and liquids such as water. Therefore the seal is intended to ensure the long-term functionality of said charging socket. This seal is a radially circumferential seal that is fit either to a sealing surface of the charging recess or to a sealing surface of the closure cover. In this case, the charging apparatus is sealed off between the closure cover and the charging cradle.

DE 10 2011 114 383 A1 discloses another charging apparatus for a vehicle that can be driven electrically. The closure cover accommodates a sealing ring that makes contact with a facing ring contour of a charging socket when the closure cover is closed.

The object of the present invention is to provide a structurally simple, easily assembled charging socket that is sealed off reliably to the outside.

SUMMARY

The charging apparatus of the invention has a sealing ring that extends around the charging socket and a closure cover with a ring attachment that makes contact with the sealing ring along the ring contour of said sealing ring when the closure cover is closed.

The sealing ring accordingly is mounted in a stationary component. The ring attachment of the closure cover bears against the seal and therefore seals off the charging socket to the outside in the closed position of the closure cover. The seal extends around the charging socket, and hence the sealing-off process does not take place in the end region of the charging socket, but rather in the region that extends around the charging socket. The seal therefore is arranged in a protected manner, as a result of which the risk of the sealing ring being mechanically damaged is largely eliminated.

Therefore, reliable sealing off of the charging apparatus in the immediate vicinity of the charging socket also is ensured after a large number of charging cycles. Accordingly, dirt, dust and liquid, in particular water, are prevented from entering the region of the electrical, mechanical contacts of the charging socket.

The charging socket preferably is cylindrical on its side that faces the closed closure cover. This cylindrical shape allows simple and reliable positioning of the sealing ring with respect to the charging socket. The sealing ring may be mounted in a recess in the charging cradle. The recess in the charging cradle may be arranged in a transition to the charging socket. Thus, the sealing ring can be supported directly on the recess and can absorb the sealing forces when the closure cover acts on said sealing ring.

The sealing ring may be circular and may have a circular cross section. In particular, the sealing element may be in the form of a hose seal that has a sufficient degree of flexibility together with an optimum sealing effect.

In contrast, the ring attachment may be stiff and may form a physical unit as a component with the closure cover. In particular, the ring attachment may be a plastic part and may be produced using injection molding.

The ring attachment may have a planar annular surface for butting against the sealing ring when the closure cover is closed. The sealing ring may compress under the action of the closure cover and may bear against the planar annular surface of the ring attachment with a relatively large sealing surface. The annular surface may be circular.

The closure cover may have a cover section that is mounted pivotably in the charging cradle, and a connection piece may be connected to the cover section. The connection piece has the ring attachment at an end, remote from the cover section.

The closure cover can be locked and unlocked in an extremely wide variety of ways, for example by a push-push mechanism. In the locked position of the closure cover, the closure cover bears against the sealing ring in the region of the ring contour of said closure cover and slightly compresses said sealing ring. The sealing ring is compressed to a somewhat greater extent when the push-push mechanism is operated, and unlocks the mechanism, so that the closure cover can then be grasped and pivoted into its open position.

To lock the closure cover and the charging cradle in the closed position with the sealing ring and the ring attachment sealed off, the closure cover may have a tappet remote from the pivot axis of the closure cover with respect to the charging cradle, and the charging cradle may have an actuating element for receiving the tappet remote from said pivot axis. The tappet can be locked and unlocked by the actuating element and the actuating element ensures that the tappet and therefore the closure cover, in the locked position, are held firmly in a defined position in which the ring contour of the closure cover and the sealing ring are sealed off from one another. Locking/unlocking of the closure cover may be performed by a push-push mechanism.

Further features of the invention can be found in the claims, the appended drawing and the description of the exemplary embodiment that is represented in the drawing, without being restricted thereto.

DETAILED DESCRIPTION

Figure 1:
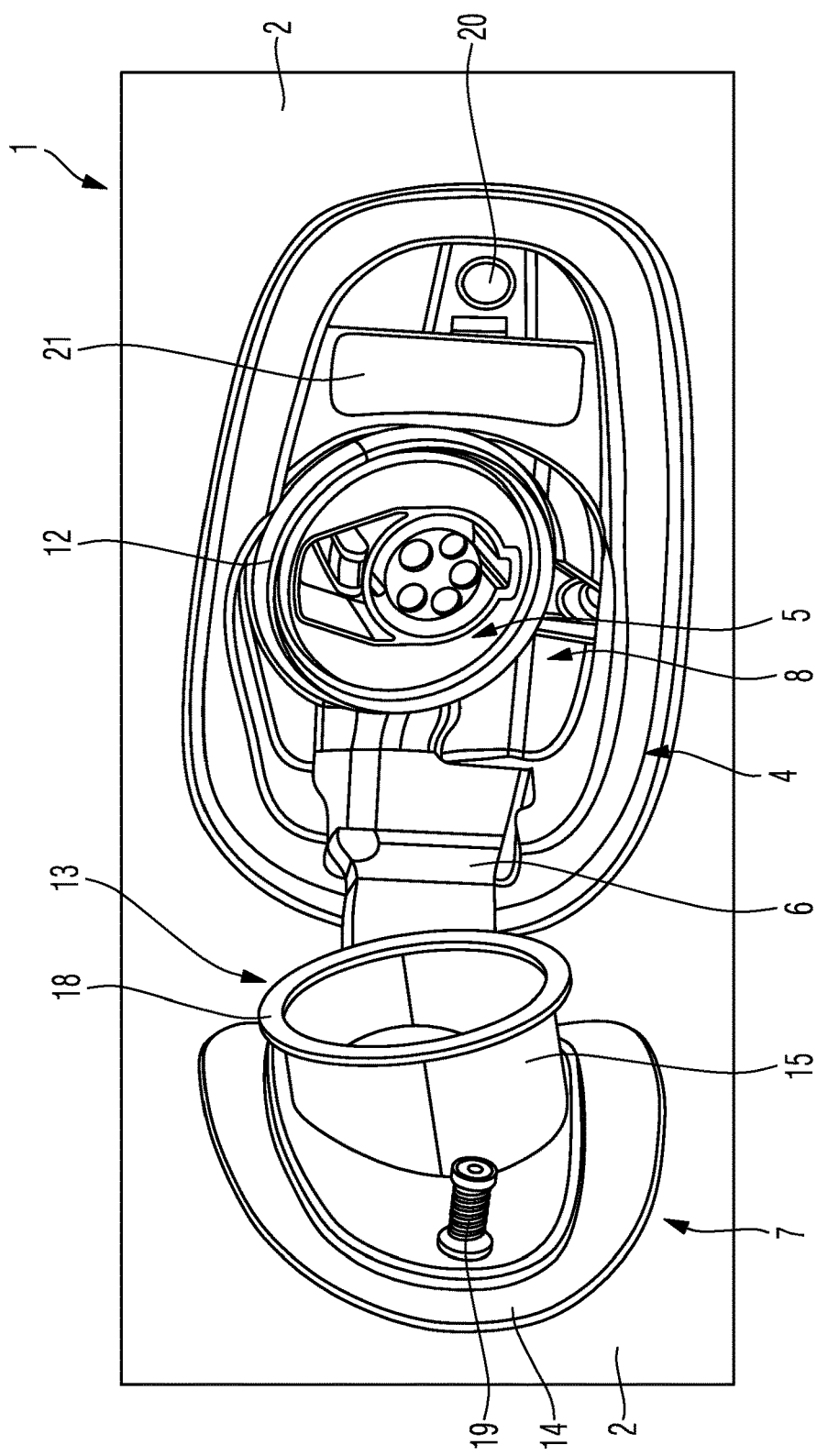
FIG. 1 shows a vehicle in the region of a vehicle body opening with the charging apparatus located there, illustrated with the closure cover in the open position.

A charging apparatus 1 is provided in a body 2 of a vehicle that can be driven electrically and has a vehicle body opening 3 to accommodate the charging apparatus 1. The charging apparatus 1 has a charging cradle 4 and an electrical charging socket 5 arranged within the charging cradle 4. A closure cover 7 is pivotably mounted in the region of a hinge 6 in the charging cradle 4. The closure cover 7 can pivot to the open position of FIG. 1 to open an access opening 8 in the charging cradle 4. Thus, the charging socket 5 is accessible and an electrical plug, not illustrated, that is connected to an electrical line can be plugged into the charging socket 5 for charging. The closure cover 7 also can pivot to the closed position illustrated in FIG. 2 so that the closure cover 7 covers the access opening 8 in the charging cradle 4 and is locked to the charging cradle 4.

The charging cradle 4 accommodates the charging socket 5 and is sealed off from the charging socket 5. Specifically a radially outer part of the plastic charging cradle 4 is mounted in a recess 9 in the vehicle body 2 in the region of the vehicle body opening 3, and is fastened there by a seal 10. The charging cradle 4 is clipped into the side part of the vehicle body 2 by clips. Starting from this outer bearing region of the charging cradle 4, the charging cradle 4 springs back to the vehicle interior and has a circumferential recess 11 that forms a sealed-off transition to the charging socket 5, radially on the inside. The recess 11 is a ring arranged adjacent to the charging socket 5 and therefore extends around the charging socket 5. The recess 11 accommodates a sealing ring 12 that is circular in accordance with the shape of the recess 11. The sealing ring 12 has a circular cross section and is in the form of a hose seal or sealing lip. The sealing ring 12 therefore extends around the charging socket 5, immediately adjacent to said charging socket 5.

Figure 2:
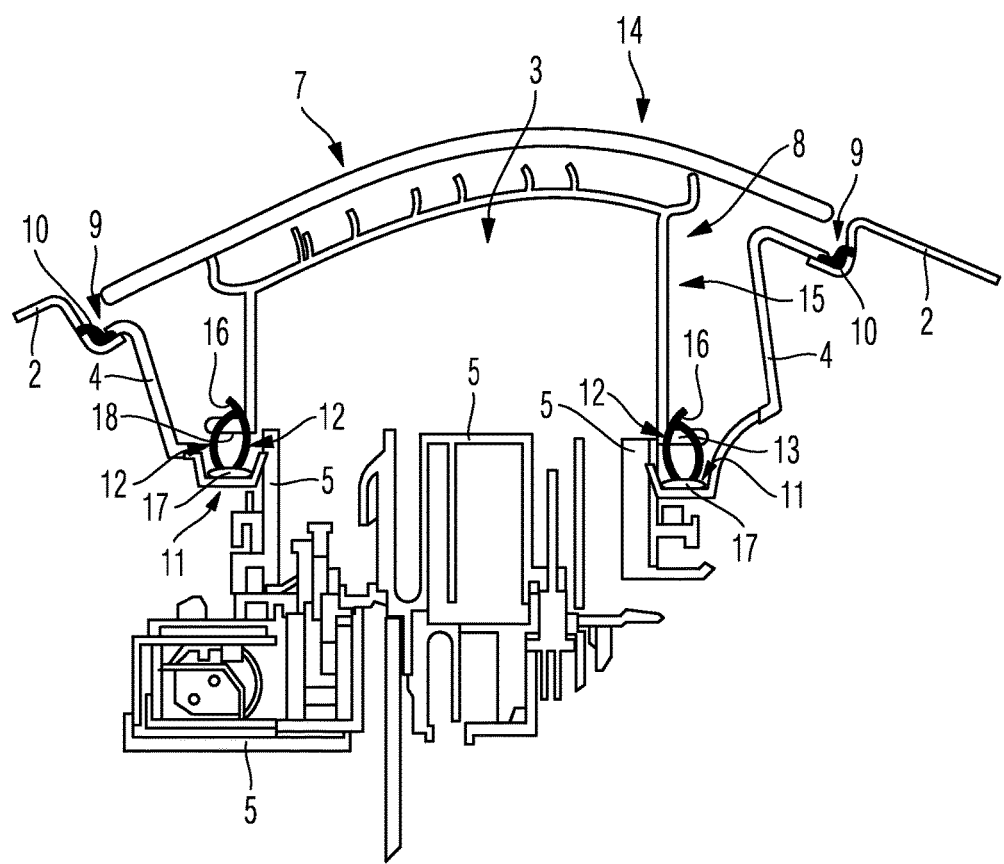
FIG. 2 shows a section through the arrangement of FIG. 1, illustrated with the closure cover closed.

The side of the closure cover 7 that faces the recess 11 in the closed position of FIG. 2 has a ring attachment 13. Specifically, the closure cover 7 has a cover section 14 that is mounted pivotably in the charging cradle 4 and has a connection piece 15 connected to the cover section 14. The connection piece 15 has the ring attachment 13 at an end remote from the cover section 14. When the closure cover 7 is closed, the ring attachment 13 makes contact with the sealing ring 12 along the ring contour of said sealing ring and slightly compresses said sealing ring. FIG. 2 illustrates the closed position of the closure cover 7, and shows the sealing ring 12 in its starting position, the position not compressed by the closure cover 7. The sealing ring 12 has a freely projecting sealing lug 16 that runs around the side of the sealing ring 12 that is remote from the recess 11.

The sealing ring 12 is a hose seal which made of cellular rubber, in particular EPDM cellular rubber. The sealing ring 12 is fastened by ring of a a double-sided adhesive tape 17 and is bonded adhesively to the recess 11 on one side and to the sealing ring 12 on the other side. This hose seal is bonded adhesively to a soft component of the charging cradle 4. The closure cover 7 and the sealing ring 12 are sealed off at the surface by the planar, annular surface 18 of the ring attachment 16 where this surface 18 faces the sealing ring 12.

The closure cover 7 is an injection-molded part and stiff overall.

FIG. 1 further illustrates locking for the closure cover 7 and the charging cradle 4 in the closed position of the closure cover 7 with the sealing ring 12 and the ring attachment 13 sealed off. In this case, the closure cover 7 has a tappet 19 remote from the pivot axis of the hinge 6, and an area of the charging cradle 4 remote from the pivot axis has an actuating element 20 for receiving the tappet 19. The tappet 19 and the actuating element 20 operate to achieve a push-push function. Therefore, by pressing the closed closure cover 7, the locking can be canceled and the closure cover 7 is pivoted slightly out of the closed position under the action of a spring element of the push-push mechanism, so that the closure cover 7 can be moved to the open position by hand. The charging socket 5 is therefore accessible to the charging plug. After the charging plug is removed from the charging socket 5, the closure cover 7 is pivoted back into the closed position by hand, and the tappet 19 locks to the actuating element 20.

The sealing-off process in the charging apparatus takes place axially and the contact pressure is generated by the actuating element 20. Thus, only low closing forces are required, and advantageous haptics are produced. Tolerances are present only within the module, independently of the charging socket 5. The sealing ring 12 can be replaced in a simple manner. Good tolerance compensation is possible, and the application of excess pressure to the actuating element also is possible. Matching surfaces can be adjusted easily, as can the adjustment of the end position, closing forces etc.

Reference numeral 21 denotes a charging button of the charging apparatus that is accommodated by the charging cradle 4.

LIST OF REFERENCE NUMERALS

1 Charging apparatus
2 Vehicle body
3 Vehicle body opening
4 Charging cradle
5 Charging socket
6 Hinge
7 Closure cover
8 Access opening
9 Recessed portion
10 Seal
11 Recess
12 Sealing ring
13 Ring attachment
14 Cover section
15 Connection piece
16 Sealing lug
17 Adhesive tape
18 Surface
19 Tappet
20 Actuating element
21 Charging button

What is claimed is:

1. A charging apparatus for a vehicle that can be driven electrically, the vehicle having an opening to accommodate the charging apparatus, the charging apparatus comprising:

a charging cradle mounted in the opening of the vehicle and having an access opening open to an exterior of the vehicle;

an electrical charging socket arranged in the opening, the charging socket having an end that faces the opening, a part of the socket adjacent the end that faces the opening being cylindrical;

a circumferential recess formed as part of the charging cradle, the circumferential recess having a base wall surrounding and aligned normal to the cylindrical part of the socket and facing toward the opening, inner and outer circumferential walls extending from the base wall toward the opening and diverging from one another at farther distances from the base wall, an end of the inner circumferential wall remote from the base wall being engaged with the cylindrical part of the socket, the circumferential recess defining a transition from the charging cradle to the socket;

a circular compressible sealing ring mounted on the base wall of the circumferential recess and between the inner and outer circumferential walls so that the sealing ring extends around the cylindrical part of the socket; and a closure cover pivotably mounted to the charging cradle and pivotable between a closed position in which the access opening is closed to the exterior of the vehicle and an open position in which the electrical charging socket is open to the exterior of the vehicle, the closure cover having a cover section with opposed inner and outer surfaces, a connection piece projecting from the inner surface in a connecting direction toward the circumferential recess of the charging cradle when the closure cover is in the closed position, and a ring attachment projecting radially out from an end of the connection piece remote from the cover in a direction substantially normal to the connecting direction, the ring attachment having a planar circular surface aligned substantially parallel to the base wall of the circumferential recess and facing the base wall of the circumferential recess when the closure cover is pivoted into the closed position, wherein the planar circular surface of the ring attachment contacts the circular sealing ring and compresses the sealing ring against the base wall of the circumferential recess when the closure cover is closed.

2. The charging apparatus of claim 1, wherein the sealing ring has a substantially circular cross section.

3. The charging apparatus of claim 1, wherein the sealing ring is in the form of a hose seal.

4. The charging apparatus of claim 1, wherein the ring attachment is stiff.

5. The charging apparatus of claim 1, wherein, to lock the closure cover and the charging cradle in the closed position of the closure cover, with the sealing ring and the ring attachment sealed off, the closure cover has a tappet remote from a pivot axis of the closure cover and the charging cradle, and the charging cradle has an actuating element for receiving the tappet.

6. The charging apparatus of claim 1, wherein the sealing ring is bonded adhesively in the recess.

7. The charging apparatus of claim 1, further comprising a double-sided adhesive having one side bonded adhesively to the recess and an opposite side bonded adhesively to the sealing ring.

* * * * *